(12) United States Patent
Chapman et al.

(10) Patent No.: US 9,139,479 B2
(45) Date of Patent: Sep. 22, 2015

(54) HONEYCOMB STRUCTURE COMPRISING A CEMENT SKIN COMPOSITION WITH CRYSTALLINE INORGANIC FIBROUS MATERIAL

(71) Applicant: Corning Incorporated, Corning, NY (US)

(72) Inventors: Thomas Richard Chapman, Painted Post, NY (US); Huthavahana Kuchibhotla Sarma, Painted Post, NY (US); John Forrest Wight, Jr., Corning, NY (US)

(73) Assignee: Corning Incorporated, Corning, NY (US)

( * ) Notice: Subject to any disclaimer, the term of this patent is extended or adjusted under 35 U.S.C. 154(b) by 174 days.

(21) Appl. No.: 13/770,104

(22) Filed: Feb. 19, 2013

(65) Prior Publication Data

US 2013/0224430 A1    Aug. 29, 2013

Related U.S. Application Data

(60) Provisional application No. 61/602,883, filed on Feb. 24, 2012.

(51) Int. Cl.
*B01D 46/24* (2006.01)
*C04B 14/38* (2006.01)
(Continued)

(52) U.S. Cl.
CPC ........ *C04B 38/0009* (2013.01); *B01D 46/2429* (2013.01); *B32B 3/12* (2013.01); *C04B 14/38* (2013.01); *C04B 14/465* (2013.01); *C04B 41/009* (2013.01); *C04B 41/5089* (2013.01); *C04B 41/85* (2013.01); *B01D 46/247* (2013.01); *B01D 46/2444* (2013.01); *C04B 2111/00793* (2013.01); *C04B 2235/526* (2013.01); *C04B 2235/5264* (2013.01); *C04B 2235/9607* (2013.01); *F01N 3/0222* (2013.01); *F01N 3/2828* (2013.01); *Y10T 428/24149* (2015.01)

(58) Field of Classification Search
None
See application file for complete search history.

(56) References Cited

U.S. PATENT DOCUMENTS

| 4,416,043 A | 11/1983 | Aoki et al. ............... 29/132 |
| 2004/0238158 A1 * | 12/2004 | Vandermeer et al. ......... 164/529 |
| 2009/0011178 A1 * | 1/2009 | Masukawa et al. .......... 428/116 |

(Continued)

FOREIGN PATENT DOCUMENTS

| EP | 554104 A2 | 1/1993 | ............ 41/85 |
| EP | 1738815 | 3/2007 | |
| WO | 2011008461 A2 | 1/2011 | ............ 41/85 |

OTHER PUBLICATIONS

"Nyco NYAD(R) G Wollastonite," data sheet, no date, retrieved Jan. 7, 2015, found at <http://www.matweb.com/>.*

(Continued)

*Primary Examiner* — David Sample
*Assistant Examiner* — Nicholas W Jordan
(74) *Attorney, Agent, or Firm* — Charles A. Greene; Matthew J. Mason

(57) ABSTRACT

Disclosed is a honeycomb support structure comprising a honeycomb body and an outer layer or skin formed of a cement that includes an inorganic filler material having a first coefficient of thermal expansion from 25° C. to 600° C. and a crystalline inorganic fibrous material having a second coefficient of thermal expansion from 25° C. to 600° C.

15 Claims, 2 Drawing Sheets

(51) Int. Cl.
*C04B 38/00* (2006.01)
*C04B 14/46* (2006.01)
*B32B 3/12* (2006.01)
*C04B 41/85* (2006.01)
*C04B 41/00* (2006.01)
*C04B 41/50* (2006.01)
*F01N 3/022* (2006.01)
*C04B 111/00* (2006.01)
*F01N 3/28* (2006.01)

(56) References Cited

U.S. PATENT DOCUMENTS

2009/0220735 A1* 9/2009 Mizuno et al. ............... 428/116
2011/0237431 A1* 9/2011 Ambrosini et al. ........... 502/439

OTHER PUBLICATIONS

"Fused Silica Material Properties," Accuratus Ceramic Corporation, data sheet, no date, retrieved Jan. 7, 2015, found at <http://www.accuratus.com/>.*

* cited by examiner

HONEYCOMB STRUCTURE COMPRISING A CEMENT SKIN COMPOSITION WITH CRYSTALLINE INORGANIC FIBROUS MATERIAL

This application claims the benefit of priority under 35 U.S.C. §119 of U.S. Provisional Application Ser. No. 61/602,883 filed on Feb. 24, 2012 the content of which is relied upon and incorporated herein by reference in its entirety.

BACKGROUND

1. Field

The present invention relates generally to honeycomb structures, and particularly to ceramic honeycomb particulate filters and substrates comprising an outer skin having a crystalline inorganic fibrous material.

2. Technical Background

Much interest has been directed towards the diesel engine due to its efficiency, durability and economical aspects. However, diesel emissions have come under attack both in the United States and Europe for their harmful effects on the environment and on humans. As such, stricter environmental regulations will require diesel engines to be held to the same standards as gasoline engines. Therefore, diesel engine manufacturers and emission-control companies are working to achieve a faster, cleaner diesel engine that meets the most stringent of requirements under all operating conditions with minimal cost to the consumer.

Diesel particulate filters and substrates with large diameters cannot currently be manufactured to the tight dimensional requirements set by original equipment manufacturers (OEMs) and the supply chain due to unpredictable drying and firing shrinkage. Consequently, a coldset ceramic cement has been used to form the exterior skin of the cordierite monolith. The coldset ceramic cement is mixed and applied to a fired, contoured substrate and the wet skin is afterward allowed to dry either under ambient conditions or by convective or microwave drying at elevated temperatures. The dried part is then ready to receive a catalyst coating and any further downstream processing required.

SUMMARY

In one embodiment, a honeycomb body includes a plurality of cells extending axially between first and second opposing end faces of the honeycomb body, the cells including intersecting porous walls. A cement mixture is deposited over a periphery of the honeycomb body, the cement mixture including an inorganic filler material having a first coefficient of thermal expansion from 25° C. to 600° C. and a crystalline inorganic fibrous material having a second coefficient of thermal expansion from 25° C. to 600° C. The inorganic filler material comprises at least 10% of the total weight of the inorganic solid components of the cement mixture and the crystalline inorganic fibrous material comprises less than 25% of the total weight of the inorganic solid components of the cement mixture. The first coefficient of thermal expansion is less than 50% of the second coefficient of thermal expansion.

In another embodiment, a method of making a honeycomb structure is described, which includes extruding a honeycomb body, the honeycomb body including a plurality of cells extending axially between first and second opposing end faces of the honeycomb body, the cells including intersecting porous walls. The method also includes shaping the honeycomb body, thereby exposing portions of the porous walls around a periphery of the honeycomb body. In addition, the method includes coating the periphery of the shaped honeycomb body with a cement mixture. The method further includes drying the cement mixture. The cement mixture includes an inorganic filler material having a first coefficient of thermal expansion from 25° C. to 600° C. and a crystalline inorganic fibrous material having a second coefficient of thermal expansion from 25° C. to 600° C. The inorganic filler material comprises at least 10% of the total weight of the inorganic solid components of the cement mixture and the crystalline inorganic fibrous material comprises less than 25% of the total weight of the inorganic solid components of the cement mixture. The first coefficient of thermal expansion is less than 50% of the second coefficient of thermal expansion.

In another embodiment, a cement mixture for application to a ceramic substrate includes an inorganic filler material having a first coefficient of thermal expansion from 25° C. to 600° C. and a crystalline inorganic fibrous material having a second coefficient of thermal expansion from 25° C. to 600° C. The inorganic filler material comprises at least 10% of the total weight of the inorganic solid components of the cement mixture and the crystalline inorganic fibrous material comprises less than 25% of the total weight of the inorganic solid components of the cement mixture. The first coefficient of thermal expansion is less than 50% of the second coefficient of thermal expansion.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION

Figure 1:
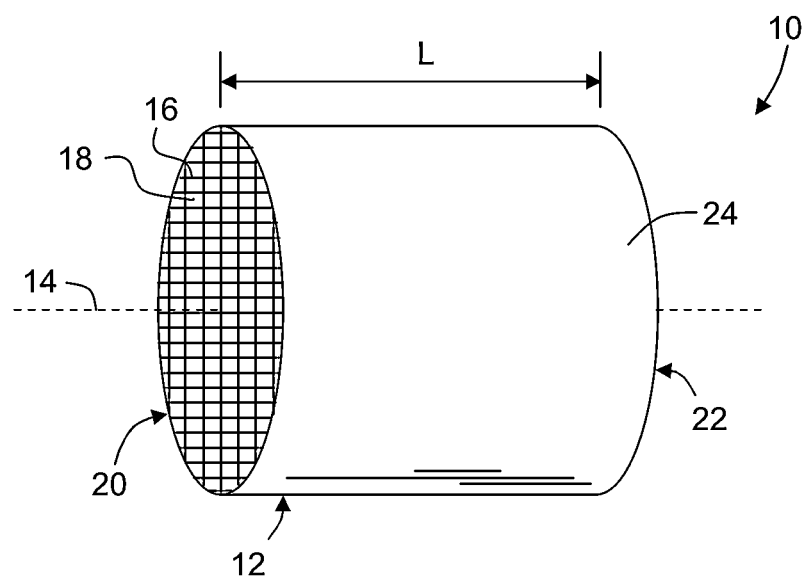
FIG. 1 is a perspective view of a honeycomb structure according an embodiment disclosed herein.

Reference will now be made in detail to embodiments of the invention, examples of which are illustrated in the accompanying drawings. Whenever possible, the same reference numeral will be used throughout the drawings to refer to the same or like parts.

As used herein, a green material is an unfired material comprising a mixture of inorganic and/or organic materials. The green material may include various inorganic filler materials, inorganic and/or organic binder materials, and liquid vehicle. The green material may be dried to remove fluid content (e.g. water). Drying is often accomplished by allowing a part to sit exposed to the ambient atmosphere overnight, however, hot air, forced air, microwave or infrared radiation may be used to augment drying.

As used herein, calcination refers to heating of a green material to a temperature less than 1000° C. for a period sufficient to burn out organic materials contained within the material, for example, 600° C. for about 3 hours.

As used herein, a "super addition" refers to a weight percent of a component, such as, for example, an organic binder, liquid vehicle, additive or pore former, based upon and relative to 100 weight percent of the inorganic components of the mixture.

Figure 2:
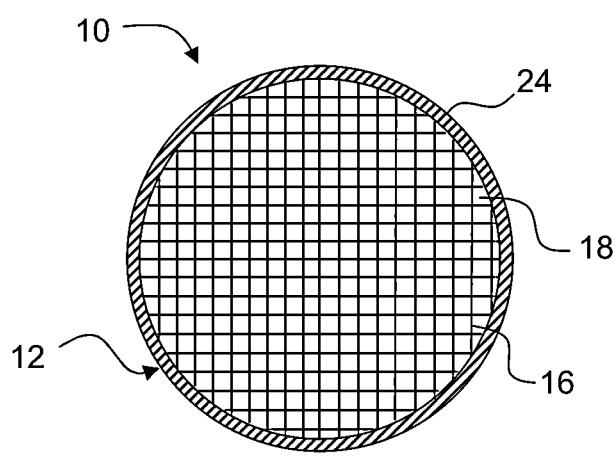
FIG. 2 is an end view of the honeycomb body of FIG. 1.

Shown in FIGS. 1 and 2 is an exemplary honeycomb structure 10 according to one embodiment comprising honeycomb body 12. Honeycomb body 12 has a longitudinal axis 14 and a length L, and comprises a plurality of intersecting porous walls 16 that form mutually adjoining cells or channels 18 extending axially between opposing end faces 20, 22. Cell density can be between 100 and 900 cells per square inch. Typical cell wall thicknesses can range from about 0.025 mm to about 1.5 mm. As used herein, the term "honeycomb" is intended to include a generally honeycomb structure but is not strictly limited to a square structure. For example, hexagonal, octagonal, triangular, rectangular or any other suitable shape may be used. Typical pore sizes contained within the porous walls can be from 0.1 μm to about 100 μm, with cell wall porosity between about 15% and 75%, preferably between about 25% and 50%.

Honeycomb body 12 may be formed from a ceramic material, such as cordierite ($2MgO\text{-}2Al_2O_3\text{-}5SiO_2$). However, limited substitution of other constituents such as Fe (iron), Co (cobalt), Ni (nickel) and Mn (manganese) for Mg (magnesium), Ga (gallium) for Al (aluminum) and Ge (germanium) for silicon is acceptable. Also, the cordierite phase may include alkali metals, alkaline earth metals or rare earth metals. Honeycomb body 12 may in certain cases be made of other ceramic materials, such as silicon carbide, aluminum titanate gamma alumina and/or mullite, or combinations thereof.

The honeycomb body can be formed according to any conventional process suitable for forming honeycomb monolithic bodies. For example, a plasticized ceramic forming batch composition can be shaped into a green body by any known conventional ceramic forming process, such as extrusion, injection molding, slip casting, centrifugal casting, pressure casting, dry pressing and the like. Typically, honeycomb structures are formed by an extrusion process where a ceramic material is extruded into a green form before the green form is fired to form the final ceramic structure. In an exemplary embodiment, the extrusion can be performed using a hydraulic ram extrusion press, a two stage de-airing single auger extruder or a twin screw mixer with a die assembly attached to the discharge end. The extruded material can be cut to create honeycomb structures such as filter bodies shaped and sized to meet the needs of engine manufacturers. These extruded green bodies can be any size or shape.

Generally, as a ceramic honeycomb structure is extruded, a solid external surface is provided along the length of the structure. Under certain circumstances, however, it may become necessary to remove the external surface. For example, a green extruded honeycomb structure may be shaped to a desired shape and size by removing the extruded external surface. Alternatively, the green honeycomb structure may be fired and then ground to the desired shape and size by removing the external extruded surface and any portion of the porous wall structure necessary to attain the desired shape and size. Shaping can be accomplished by any means known in the art, including cutting, sanding or grinding away the outer extruded surface of the honeycomb structure to achieve the desired shape and size. Once the desired shape and size has been attained, a cement material can be applied to an outer periphery of the sized body to form a new external surface, or skin, on the body. Typically, the ends of the honeycomb body are not covered with the cement, although certain passages may be plugged if desired. Once the cement composition has been applied to the honeycomb structure, the cement composition can be dried and/or calcined. In some embodiments, the honeycomb body over which the cement is applied comprises fired ceramic material. In other embodiments, the honeycomb body comprises a green body or a calcined body. In some cases, final firing of the calcined honeycomb structure can take place during the catalyzation process.

Various methods may be employed to apply a layer of cement to honeycomb body 12. For example, a dispensing device (not shown) can be used to apply an appropriate amount of cement mixture to the external surface of the honeycomb body 12. Methods of applying a skin material (e.g. cement) are well known in the art and not discussed further herein. For example, U.S. patent application Ser. No. 12/231,140, the content of which is incorporated herein by reference in its entirety, describes various methods of applying a cement skin to a honeycomb body.

Accordingly, honeycomb structure 10 further comprises outer wall 24 deposited over peripheral surfaces of honeycomb body 12. Outer wall 24 (hereinafter skin 24) is a cement comprising an inorganic filler material having a first coefficient of thermal expansion from 25° C. to 600° C. and a crystalline inorganic fibrous material having a second coefficient of thermal expansion from 25° C. to 600° C.

In exemplary embodiments, the inorganic filler material comprises at least 10% of the total weight of the inorganic solid components of the cement mixture and the crystalline inorganic fibrous material comprises less than 25% of the total weight of the inorganic solid components of the cement mixture. In exemplary embodiments, the first coefficient of thermal expansion is less than 50% of the second coefficient of thermal expansion.

For example, the inorganic filler material can comprise from 20% to 80%, such as from 25% to 75%, and further such as from 30% to 70%, and yet further such as from 35% to 65%, including at least 50%, at least 60%, or at least 70% of the total weight of the inorganic solids components of the cement mixture. The crystalline inorganic fibrous material can comprise from 3% to 20%, such as from 5% to 15%, and further such as from 8% to 12%, including less than 10%, less than 15%, or less than 20% of the total weight of the inorganic solids components of the cement mixture.

The first coefficient of thermal expansion, can, in certain exemplary embodiments range from $0.5 \times 10^{-7}/°$ C. to $20 \times 10^{-7}/°$ C., such as from $1.0 \times 10^{-7}/°$ C. to $10 \times 10^{-7}/°$ C. and further such as from $2.0 \times 10^{-7}/°$ C. to $5 \times 10^{-7}/°$ C., including less than $7 \times 10^{-7}/°$ C., and including about $2.5 \times 10^{-7}/°$ C. The second coefficient of thermal expansion can, in certain exemplary embodiments, range from $10 \times 10^{-7}/°$ C. to $100 \times 10^{-7}/°$ C., such as from $20 \times 10^{-7}/°$ C. to $90 \times 10^{-7}/°$ C., and further such as from $30 \times 10^{-7}/°$ C. to $80 \times 10^{-7}/°$ C., including at least $50 \times 10^{-7}/°$ C., and including about $65 \times 10^{-7}/°$ C. The first coefficient of thermal expansion can, in certain exemplary embodiments, be less than $5 \times 10^{-7}/°$ C. while the second coefficient of thermal expansion can be greater than $30 \times 10^{-7}/°$ C. The first coefficient of thermal expansion can, in certain exemplary embodiments, be less than 25% of the second coefficient of thermal expansion, such as less than 20% of the second coefficient of thermal expansion, and further such as less than 15% of the second coefficient of thermal expansion, and yet further such as less than 10% of the second coefficient of thermal expansion, and still yet further such as less than 5% of the second coefficient of thermal expansion, such as from 1% to 20% of the second coefficient of thermal expansion, and further such as from 2% to 10% of the second coefficient of thermal expansion.

In certain exemplary embodiments, at least 50% by weight of the crystalline inorganic fibrous material has an aspect ratio (longest dimension divided by shortest dimension) of from 3:1 to 10:1, such as from 4:1 to 8:1. In certain exemplary embodiments, less than 10% by weight of the crystalline inorganic fibrous material has an aspect ratio of less than 3:1. In certain exemplary embodiments, less than 5% by weight of the crystalline inorganic fibrous material has an aspect ratio of less than 3:1. In certain exemplary embodiments, the average aspect ratio of the crystalline inorganic fibrous material is from 3:1 to 10:1, such as from 4:1 to 8:1, including about 5:1. All aspect ratio measurements herein are made using scanning electron microscopy (SEM) according to methods known to those skilled in the art, unless otherwise indicated.

In certain exemplary embodiments, the crystalline inorganic fibrous material has an average diameter of from 2 to 80 microns, such as from 5 to 50 microns, and further such as from 10 to 30 microns. The crystalline inorganic fibrous material can, in certain exemplary embodiments, have an average length of from 10 to 500 microns, such as from 50 to 400 microns, and further such as from 100 to 300 microns.

In certain exemplary embodiments, the crystalline inorganic fibrous material can comprise a finer fibrous material having an average diameter of from 2 to 10 microns and an average length of from 10 to 50 microns. The crystalline inorganic fibrous material may also comprise a relatively coarser fibrous material having an average diameter of from 20 to 60 microns and an average length of from 100 to 300 microns. The crystalline inorganic fibrous material may also comprise a fibrous material of intermediate coarseness, having an average diameter of from 10 to 20 microns and an average length of from 50 to 100 microns.

The crystalline inorganic fibrous material can, in certain exemplary embodiments, be present in the cement mixture in a single distribution (e.g., of only one of a finer fibrous material, coarser fibrous material, and fibrous material of intermediate coarseness), a bi-modal distribution (e.g., of two of a finer fibrous material, coarser fibrous material, and fibrous material of intermediate coarseness), or a tri-modal distribution (e.g., of three of a finer fibrous material, coarser fibrous material, and fibrous material of intermediate coarseness).

Applicants have surprisingly found that a finer fibrous material correlates to a lower amount of said fibrous material being present in certain exemplary cement mixtures having similar characteristics with respect to at least one property. Accordingly, one set of exemplary embodiments includes a cement mixture comprising a crystalline inorganic fibrous material, which comprises from 3% to 10% of the total weight of the inorganic solid components of the cement mixture, wherein the crystalline inorganic fibrous material has an average diameter of from 2 to 10 microns and an average length of from 10 to 50 microns. Exemplary embodiments also include those having a cement mixture comprising a crystalline inorganic fibrous material, which comprises from 5% to 15% of the total weight of the inorganic solid components of the cement mixture, wherein the crystalline inorganic fibrous material has an average diameter of from 10 to 20 microns and an average length of from 50 to 100 microns. Exemplary embodiments also include those having a cement mixture comprising a crystalline inorganic fibrous material, which comprises from 10% to 20% of the total weight of the inorganic solid components of the cement mixture, wherein the crystalline inorganic fibrous material has an average diameter of from 20 to 60 microns and an average length of from 100 to 300 microns.

In certain exemplary embodiments, less than 5%, such as less than 2%, and further such as less than 1% by weight of the crystalline inorganic fibrous material has a diameter of greater than 250 microns. In certain exemplary embodiments, the crystalline inorganic fibrous material is essentially free of material having a diameter of greater than 250 microns.

In certain exemplary embodiments, less than 5%, such as less than 2%, and further such as less than 1% by weight of the crystalline inorganic fibrous material has a diameter of greater than 200 microns. In certain exemplary embodiments, the crystalline inorganic fibrous material is essentially free of material having a diameter of greater than 200 microns.

In certain exemplary embodiments, less than 5%, such as less than 2%, and further such as less than 1% by weight of the crystalline inorganic fibrous material has a diameter of greater than 150 microns. In certain exemplary embodiments, the crystalline inorganic fibrous material is essentially free of material having a diameter of greater than 150 microns.

In certain exemplary embodiments, less than 5%, such as less than 2%, and further such as less than 1% by weight of the crystalline inorganic fibrous material has a diameter of greater than 100 microns. In certain exemplary embodiments, the crystalline inorganic fibrous material is essentially free of material having a diameter of greater than 100 microns.

In certain exemplary embodiments, less than 5%, such as less than 2%, and further such as less than 1% by weight of the crystalline inorganic fibrous material has a diameter of greater than 50 microns. In certain exemplary embodiments, the crystalline inorganic fibrous material is essentially free of material having a diameter of greater than 50 microns.

In certain exemplary embodiments, the crystalline inorganic fibrous material consists essentially of inorganic fibers having an aspect ratio of at least 2:1. In certain exemplary embodiments, the crystalline inorganic fibrous material contains less than 5%, such as less than 2%, and further such as less than 1% by weight of shot or filler material. In certain exemplary embodiments, the crystalline inorganic fibrous material is essentially free of shot or filler material.

In certain exemplary embodiments, at least 95%, such as at least 98%, and further such as at least 99% by weight of the crystalline inorganic fibrous material has an aspect ratio of at least 2:1. In certain exemplary embodiments, substantially all of the crystalline inorganic fibrous material has an aspect ratio of at least 2:1.

Figure 3:
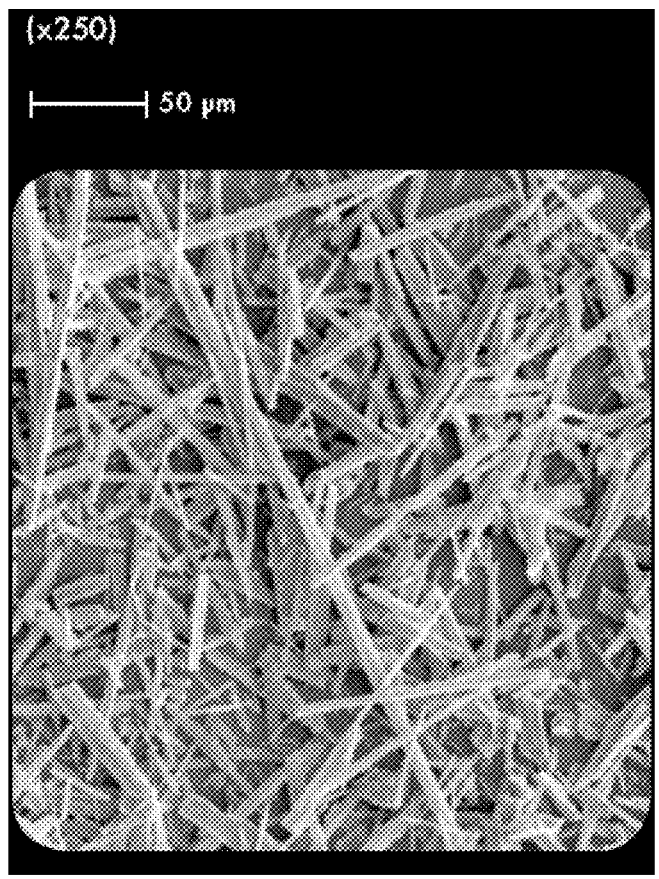
FIG. 3 is an SEM image of a crystalline inorganic fibrous material (wollastonite) that can be used in embodiments disclosed herein.

In certain exemplary embodiments, the crystalline inorganic fibrous material comprises a naturally occurring crystalline inorganic fibrous material. In certain exemplary embodiments, the crystalline inorganic fibrous material comprises an alkaline earth silicate, such as a naturally occurring alkaline earth silicate. An example of a suitable alkaline earth silicate is wollastonite ($CaSiO_3$), such as that available under the trade name Ultrafibe II, available from NYCO Minerals Incorporated, Willsboro, N.Y., USA. An SEM image of wollastonite, showing its fibrous nature, is shown in FIG. 3.

In certain exemplary embodiments, the inorganic filler material comprises at least one of ground cordierite and fused silica glass powder.

In certain exemplary embodiments, the inorganic filler material comprises cordierite, such as ground cordierite.

In certain exemplary embodiments, the inorganic filler material comprises glass powder, such as fused silica glass powder.

The glass powder filler material can have a median particle size (D50) between 10 and 20 μm, with, for example, a minimum particle size between 7 μm and 75 μm and a maximum particle size between 50 μm and 70 μm. Particle size was determined as a mass-based equivalent spherical diameter. The glass powder filler material may comprise, for example, from 60% to 80% by weight of the total inorganic components of the cement. Suitable silica powder filler materials are available, for example, under the trade name Teco-Sil, available from CE Minerals of Tennessee Electro Minerals Incorporated, Tennessee, USA. All particle size measurements herein were made with a Microtrac Inc. particle size analyzer, unless otherwise indicated.

In another embodiment, skin 24 of honeycomb structure 10 may comprise an amorphous glass-based cement, the cement formed from a composition comprising a first (fine) glass powder as a low thermal expansion filler material, a second (coarse) glass powder as a low thermal expansion filler material, a crystalline inorganic fibrous material, a binder and a solvent or vehicle for carrying the solid constituents of the glass-based cement. In certain exemplary embodiments, the glasses of both the first glass powder filler material and the second glass powder filler material are amorphous fused silica having particle sizes greater than about 1 micron. The distribution of glass powder filler material particle size may be multimodal in that a distribution of the glass powder filler material with particle sizes greater than about 1 micron exhibits multiple modes (local maximums) of particle sizes. In one embodiment, the amorphous glass-based cement comprises a bimodal particle size distribution of amorphous glass particles with a particle size greater than about 1 micron. The glass based cement may include a first glass powder filler material wherein a median (D50) particle size of the first glass powder filler material can be in a range from about 10 microns to about 50 microns, from about 15 microns to about 50 microns, from about 20 microns to about 45 microns or from about 30 microns to about 45 microns, with a D10 in a range from about 1 micron to about 10 microns and D90 in a range from about 25 microns to about 125 microns. A median (D50) particle size of the second glass powder filler material can be in a range from about 150 microns to about 300 microns, in a range from about 150 microns to about 250 microns, in a range from about 170 microns to about 230 microns, in a range from about 180 microns to about 220 microns, with D10 in a range from about 100 microns to about 150 microns, and D90 in a range from about 250 microns to about 350 microns. Particle sizes are determined as a mass-based equivalent spherical diameter. As used herein, the term D50 represents the median of the distribution of particle sizes, D10 represents the particle size in microns for which 10% of the distribution are smaller than the particle size, and D90 represents the particle size in microns for which 90% of the distribution are smaller than the particle size. All particle size measurements herein are made with a Microtrac Inc. particle size analyzer, unless otherwise indicated The glass based cement may contain, for example, an amount of the first glass powder filler material in a range from about 20% to about 60% by weight of the total weight of the inorganic solid components of the cement, in a range from about 25% to about 50% by weight, in a range from about 25% to about 40% by weight, or in a range from about 25% to about 35% by weight. The glass based cement may contain, for example, an amount of the second glass powder filler material in a range from about 10% to about 40% by weight of the total weight of the inorganic solid components of the cement, in a range from about 15% to about 40% by weight, in a range from about 20% to about 35% by weight.

In one embodiment, D50 of the first glass powder filler material may be in a range from about 34 microns to about 40 microns, and a median particle size of the second glass powder filler material is in a range from about 190 microns to about 280 microns. In one example, the first glass powder filler material has a D10 of about 6.0 microns, a D50 of about 34.9 microns and a D90 of about 99 microns. In another example, the first glass powder filler material has a D10 of about 6.7 microns, a D50 of about 39.8 microns, and a D90 of about 110.9 microns. In still another example, the first glass powder has a D10 of about 2.7 microns, a D50 of about 13.8 microns and a D90 of about 37.8 microns, and is yet another example, the first glass powder filler material has a D10 of about 2.8 microns, a D50 of about 17.2 microns and a D90 of about 47.9 microns.

The ratio of the second glass powder filler material to the first glass powder filler material may be in a range from about 1:4 to about 1:1, such as about 1:3.5 to about 1:1, from about 1:3 to about 1:1, from about 1:2.5 to about 1:1, from about 1.2 to about 1:1 or from about 1:1.5 to about 1:1. In one exemplary embodiment, the ratio of the second glass powder filler material to the first glass powder filler material is about 1:1.

To provide the cement compositions of the present disclosure, the inorganic powders comprising any of the above inorganic powders and any optional inorganic additive components can be mixed together with a suitable organic and/or inorganic binder material. The organic binder material may comprise one or more organic materials, such as a cellulose ether, methylcellulose, ethylcellulose, polyvinyl alcohol, polyethylene oxide and the like, or in some embodiments a gum-like material such as Actigum®, xanthan gum or latex. For example, A4 Methocel is a suitable organic binder. Methocel A4 is a water-soluble methyl cellulose polymer binder available from Dow Chemical. The organic binder material may, for example, be present in the cement composition in an amount of from 0.1% to 10% by weight, such as from 0.2% to 5%, and further such as from 0.5% to 2%.

A suitable inorganic binder may comprise colloidal silica or alumina comprising nanometer-scale silica or alumina particles suspended in a suitable liquid, such as water. The inorganic binder material may, for example, be present in the cement composition in an amount less than about of from 2% to 35% of the total weight of inorganic solids present in the cement, and in some embodiments inorganic binders are present in an amount of from 5% to 30%, and in certain other embodiments in an amount of from 10% to 25%. A suitable colloidal silica binder material is Ludox HS-40 produced by W.R. Grace. Typical colloidal binder materials may comprise approximately 40% by weight solid material as a suspension in a deionized water vehicle.

Typically, the preferred liquid vehicle or solvent for providing a flowable or paste-like consistency has included water, such as deionized (DI) water, although other materials may be used. The liquid vehicle content may be present as a super addition in an amount equal to or less than about 30% of the total weight of the inorganic components of the cement mixture, such as a range of from about 10% to about 25% of the total weight of the inorganic components of the cement mixture. However, the liquid vehicle is typically adjusted to obtain a viscosity suitable to make the cement easy to apply.

In some embodiments, the cement may optionally further contain organic modifiers, such as adhesion promoters for enhancing adhesion between the cement and the honeycomb body. For example, Michem 4983 has been found suitable for this purpose.

In certain exemplary embodiments, the cement mixture sets at a temperature of less than 1000° C., such as a temperature of less than 800° C., and further such as a temperature of less than 600° C., and yet further such as a temperature of less than 400° C., and still yet further such as a temperature of less than 200° C. In certain exemplary embodiments, the cement mixture is capable of setting at room temperature (i.e., at about 25° C.).

Table 1 below sets forth examples of four different batches of different cement mixtures (excluding water), the first of which is comparative and the second, third, and fourth of which are according to embodiments described herein, each cement mixture containing: (i) an amorphous fused silica filler material with a particle size greater than 1 micron and a coefficient of thermal expansion from 25° C. to 600° C. of less than $5 \times 10^{-7}/°$ C.; and (ii) a crystalline inorganic fibrous material (wollastonite) with an average aspect ratio of from 4:1 to 8:1 and a coefficient of thermal expansion of greater than $50 \times 10^{-7}/°$ C.; where the weight percent for the first silica powder filler material and the crystalline inorganic fibrous material are expressed as a percent of the total inorganic components of the cement.

TABLE 1

| Component | Batch 1 wt % | Batch 2 wt % | Batch 3 wt % | Batch 4 wt % |
|---|---|---|---|---|
| Fused silica (C-E Minerals −200 F) | 38.1 | 36.3 | 33.2 | 30.5 |
| Fused silica (C-E Minerals 80×105) | 38.1 | 36.3 | 33.2 | 30.5 |
| Wollastonite (NYCO Ultrafibe II) | 0.0 | 3.6 | 9.9 | 15.2 |
| Methylcelluose (Dow A4M) | 0.8 | 0.8 | 0.8 | 0.8 |
| Colloidal silica (Grace Ludox HS-40) | 23 | 22.9 | 22.9 | 23 |

Figure 4:
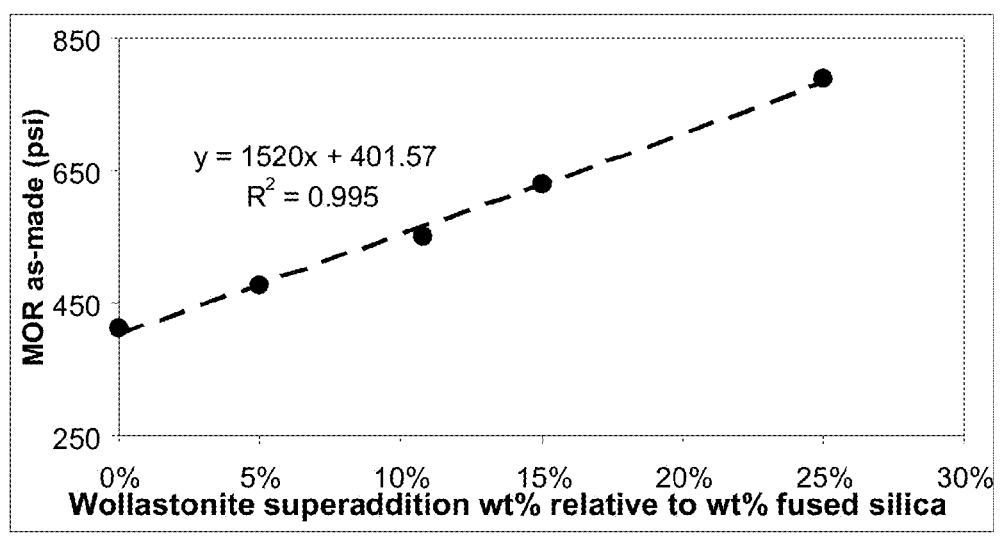
FIG. 4 is a plot of modulus of rupture versus fibrous material super addition (wt %) relative to inorganic filler material (wt %) according to embodiments disclosed herein.

The cement mixtures of Batches 1-4 were mixed with an appropriate amount of water to make a paste, which was subsequently cast into sheets. Modulus of rupture was determined for the cast (uncalcined) sheets in four point flexure according to ASTM C158, Standard Test Methods for Strength of Glass by Flexure (Determination of Modulus of Rupture). FIG. 4 depicts the measured modulus of rupture for Batches 1-4.

In certain exemplary embodiments, the cement mixture has an uncalcined modulus of rupture of at least 500 psi, such as at least 550 psi, and further such as at least 600 psi, and still further such as at least 650 psi, and yet still further such as at least 700 psi, and even yet still further such as at least 750 psi.

In certain exemplary embodiments, the cement mixture has an uncalcined modulus of rupture of at least 500 psi while the crystalline inorganic fibrous material comprises less than 20% of the total weight of the inorganic solids components of the cement mixture. In certain exemplary embodiments, the cement mixture has an uncalcined modulus of rupture of from 500 to 800 psi while the crystalline inorganic fibrous material comprises from 3% to 20% of the total weight of the inorganic solids components of the cement mixture. In certain exemplary embodiments, the cement mixture has an uncalcined modulus of rupture of from 500 to 800 psi while the crystalline inorganic fibrous material comprises from 5% to 15% of the total weight of the inorganic solids components of the cement mixture.

Cement compositions described herein can exhibit viscosities well suited for forming an external skin over a honeycomb body. For example, compositions according to the embodiments herein can have an infinite shear viscosity equal to or less than about 12 Pascal-seconds (Pa·s.), equal to or less than about 5 Pa·s, or equal to or less than about 4 Pa·s. For a shear rate of 10 s$^{-1}$, the shear viscosity may, for example, be equal to or less than about 400 Pa·s, equal to or less than about 350 Pa·s or less than or equal to about 300 Pa·s. Viscosity was measured using a parallel plate viscometer.

Calcining of cement compositions disclosed herein can be conducted in a box furnace with a linear ramp to 600° C. in 3 hours, followed by a hold for 3 hours at 600° C., then followed by a ramp down to room temperature over a time period of 3 hours. In commercial use, the ceramic article would be wash coated with catalyst followed by a heat treatment to remove organic materials. The ceramic article would also be canned with a mat material that may also require heat treatment to remove organic materials. The calcining process simulates service conditions experienced by the ceramic article.

Calcined cement compositions described herein can exhibit an elastic modulus equal to or less than about $1 \times 10^6$, equal to or less than about $7 \times 10^5$ Pa, equal to or less than about $5 \times 10^5$ Pa or equal to or less than about $4 \times 10^5$ Pa. In certain embodiments the elastic modulus is in a range from about $2 \times 10^5$ Pa to about $6 \times 10^5$ Pa.

Calcined cement compositions described herein can exhibit an average thermal shock final pass temperature of at least 600° C. using the method described as follows. First, an oven is preheated to a first temperature and stabilized. Then, a room temperature article (i.e. 23° C.), such as a honeycomb body comprising a ceramic skin, such as embodiments thereof described herein, is plunged into the hot oven for 30 minutes. After the 30 minute period, the hot article is removed from the oven and air quenched back to room temperature without forced cooling (e.g. blowing chilled air, etc.). The article is transferred from the hot and cold locations on low thermal mass ceramic setters (1" cubes of cordierite cellular ceramic). The article is inspected for cracks in the skin and honeycomb body using non-destructive methods including visual inspection (aided with 10× magnification), transmitted light and ultrasound pulse-echo. The article is deemed to have failed when a crack is detected in the honeycomb body or cement skin. When an article survives, the oven is set to a higher temperature and the process is repeated. The last temperature passed and 1$^{st}$ temperature failed bracket the performance of the article. In the case of the data presented herein, the 1$^{st}$ temperature is 500° C. and each successive step is an addition of 50° C. The last temperature survived is reported. No temperatures in excess of 1100° C. are used.

Accordingly, in certain embodiments, the calcined cement skin of the ceramic structure exhibited no visible cracks under 10× magnification after heating to a temperature of 600° C. for 30 minutes followed by unforced cooling to 23° C. In certain other embodiments, the calcined cement skin of the ceramic structure exhibited no visible cracks under 10× magnification after heating to a temperature of 1000° C. for 30 minutes followed by unforced cooling to 23° C.

While the cement mixture compositions disclosed herein have been described for skin applications, it is contemplated that they may be used for other applications relating to honeycomb bodies and ceramic particulate filters including for plugging at least some of the ends of the channels of the honeycomb bodies or for adhering segments of honeycomb bodies together.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A honeycomb structure comprising:
    a honeycomb body including cells extending axially between first and second opposing end faces of the honeycomb body, the cells comprising intersecting porous walls;
    a cement mixture deposited over a periphery of the honeycomb body, the cement mixture comprising:
        an inorganic filler material having a first coefficient of thermal expansion from 25° C. to 600° C.; and
        a crystalline inorganic fibrous material having a second coefficient of thermal expansion from 25° C. to 600° C., wherein,
    the inorganic filler material comprises at least 10% of the total weight of the inorganic solid components of the cement mixture
    the first coefficient of thermal expansion is less than 50% of the second coefficient of thermal expansion,
    the crystalline inorganic fibrous material comprises 3% to 10% of the total weight of the inorganic solid components of the cement mixture, wherein the crystalline inorganic fibrous material has an average diameter of from 2 to 10 microns and an average length of from 10 to 50 microns;
    the crystalline inorganic fibrous material comprises 5% to 15% of the total weight of the inorganic solid components of the cement mixture, wherein the crystalline inorganic fibrous material has an average diameter of from 10 to 20 microns and an average length of from 50 to 100 microns; or
    the crystalline inorganic fibrous material comprises 10% to 20% of the total weight of the inorganic solid components of the cement mixture, wherein the crystalline inorganic fibrous material has an average diameter of from 20 to 60 microns and an average length of from 100 to 300 microns.

2. The honeycomb structure according to claim 1, wherein the cement mixture sets at a temperature of less than 1000° C.

3. The honeycomb structure according to claim 1, wherein at least 50% by weight of the crystalline inorganic fibrous material has an aspect ratio of from 3:1 to 10:1.

4. The honeycomb structure according to claim 1, wherein less than 5% by weight of the crystalline inorganic fibrous material has a diameter of greater than 250 microns.

5. The honeycomb structure according to claim 1, wherein the inorganic filler material comprises from 20% to 80% of the total weight of the inorganic solids components of the cement mixture, the crystalline inorganic fibrous material comprises from 3% to 20% of the total weight of the inorganic solids components of the cement mixture, the first coefficient of thermal expansion ranges from $0.5 \times 10^{-7}/°$ C. to $20 \times 10^{-7}/°$ C., and the second coefficient of thermal expansion ranges from $10 \times 10^{-7}/°$ C. to $100 \times 10^{-7}/°$ C.

6. The honeycomb structure according to claim 1, wherein the cement mixture, subsequent to setting, has an uncalcined modulus of rupture of at least 500 psi.

7. The honeycomb structure according to claim 1, wherein the crystalline inorganic fibrous material comprises an alkaline earth silicate.

8. The honeycomb structure according to claim 7, wherein the crystalline inorganic fibrous material comprises wollastonite ($CaSiO_3$).

9. The honeycomb structure according to claim 1, wherein the inorganic filler material comprises a material selected from the group consisting of fused silica glass powder and ground cordierite.

10. The honeycomb structure according to claim 1, wherein the cement mixture further comprises an organic binder, an inorganic binder, and a liquid vehicle.

11. A cement mixture for application to a ceramic substrate, the cement mixture comprising:
    an inorganic filler material having a first coefficient of thermal expansion from 25° C. to 600° C.; and
    a crystalline inorganic fibrous material having a second coefficient of thermal expansion from 25° C. to 600° C., wherein,
    the inorganic filler material comprises at least 10% of the total weight of the inorganic solid components of the cement mixture,
    the first coefficient of thermal expansion is less than 50% of the second coefficient of thermal expansion,
    the crystalline inorganic fibrous material comprises 3% to 10% of the total weight of the inorganic solid components of the cement mixture, wherein the crystalline inorganic fibrous material has an average diameter of from 2 to 10 microns and an average length of from 10 to 50 microns;
    the crystalline inorganic fibrous material comprises 5% to 15% of the total weight of the inorganic solid components of the cement mixture, wherein the crystalline inorganic fibrous material has an average diameter of from 10 to 20 microns and an average length of from 50 to 100 microns; or
    the crystalline inorganic fibrous material comprises 10% to 20% of the total weight of the inorganic solid components of the cement mixture, wherein the crystalline inorganic fibrous material has an average diameter of from 20 to 60 microns and an average length of from 100 to 300 microns.

12. The cement mixture according to claim 11, wherein at least 50% by weight of the crystalline inorganic fibrous material has an aspect ratio of from 3:1 to 10:1.

13. The cement mixture according to claim 11, wherein less than 5% by weight of the crystalline inorganic fibrous material has a diameter of greater than 250 microns.

14. The cement mixture according to claim 11, wherein the cement mixture, subsequent to setting, has an uncalcined modulus of rupture of at least 500 psi.

15. The cement mixture according to claim 11, wherein the crystalline inorganic fibrous material comprises wollastonite ($CaSiO_3$).

* * * * *